(12) United States Patent
Karlsen et al.

(10) Patent No.: US 9,442,210 B2
(45) Date of Patent: Sep. 13, 2016

(54) OPEN COLLAR FOR MULTI-CABLE TOWING SYSTEM

(71) Applicant: PGS Geophysical AS, Lysaker (NO)

(72) Inventors: Kenneth Karlsen, Aalesund (NO); Knut Johan Røssberg, Stord (NO)

(73) Assignee: PGS Geophysical AS, Oslo (NO)

( * ) Notice: Subject to any disclaimer, the term of this patent is extended or adjusted under 35 U.S.C. 154(b) by 465 days.

(21) Appl. No.: 13/691,517

(22) Filed: Nov. 30, 2012

(65) Prior Publication Data
US 2014/0153361 A1 Jun. 5, 2014

(51) Int. Cl.
*G01V 1/38* (2006.01)
*G01V 1/20* (2006.01)

(52) U.S. Cl.
CPC .............. *G01V 1/38* (2013.01); *G01V 1/202* (2013.01); *G01V 1/3843* (2013.01)

(58) Field of Classification Search
CPC .................................................... G01V 1/38
USPC .............................................................. 367/16
See application file for complete search history.

(56) References Cited

U.S. PATENT DOCUMENTS

| | | | | |
|---|---|---|---|---|
| 4,756,268 A * | 7/1988 | Gjestrum | .............. | G01V 1/201 114/242 |
| 5,191,681 A * | 3/1993 | Lokken | .................. | A45D 44/08 24/7 |
| 5,600,608 A * | 2/1997 | Weiss | ..................... | G01V 1/201 367/154 |
| 6,020,545 A * | 2/2000 | Consoli | .................... | G10D 9/02 84/383 R |
| 7,142,481 B1 | 11/2006 | Metzbower et al. | | |
| 7,184,365 B2 * | 2/2007 | George | .................. | G01V 1/201 367/154 |
| 7,518,953 B2 | 4/2009 | Hegna et al. | | |
| 8,348,543 B2 * | 1/2013 | Olivier | .................. | B63B 21/663 114/245 |
| 2003/0226488 A1 * | 12/2003 | Grieger | ................. | B63B 21/663 114/244 |
| 2010/0170428 A1 * | 7/2010 | Toennessen | ............ | B63B 21/66 114/249 |
| 2013/0088938 A1 | 4/2013 | Aaron et al. | | |

FOREIGN PATENT DOCUMENTS

| | | |
|---|---|---|
| EP | 1600795 A2 | 11/2005 |
| EP | 2420866 A1 | 11/2005 |
| EP | 2343575 A1 | 7/2011 |
| WO | WO 96/39975 | 12/1996 |
| WO | 2010009249 A2 | 1/2010 |

OTHER PUBLICATIONS

PCT Search report and Written opinion of the International Searching Authority mailed on Aug. 6, 2014, for International Application No. PCT/EP2013/073735, 9 pages.
"Open Top Show Curtain Rings" available at http://www.shower-rods-etc.com/Customrods/pc/Open-Top-Shower-Curtain-Rings-34p148.htm, dated 2011.
"GeoStreamer GS™—The Ghost Free Solution", TECH LINK, PGS publication, vol. 11, No. 4, May 2011.

* cited by examiner

*Primary Examiner* — James Hulka
*Assistant Examiner* — John T Nolan

(57) ABSTRACT

Disclosed are methods and systems for towing multiple source cables with spreader lines coupled to the source cables using open collars. An example system for multi-cable towing may comprise a plurality of source cables coupled to a survey vessel. The example system may further comprise a plurality of energy sources, wherein each o the energy sources is coupled to a respective one of the source cables. The example system may further comprise a plurality of spreader lines extending between the source cables. The example system may further comprise a plurality of open collars coupling the spreader lines to the source cables, wherein the open collars are slidably coupled to the source cables.

18 Claims, 6 Drawing Sheets

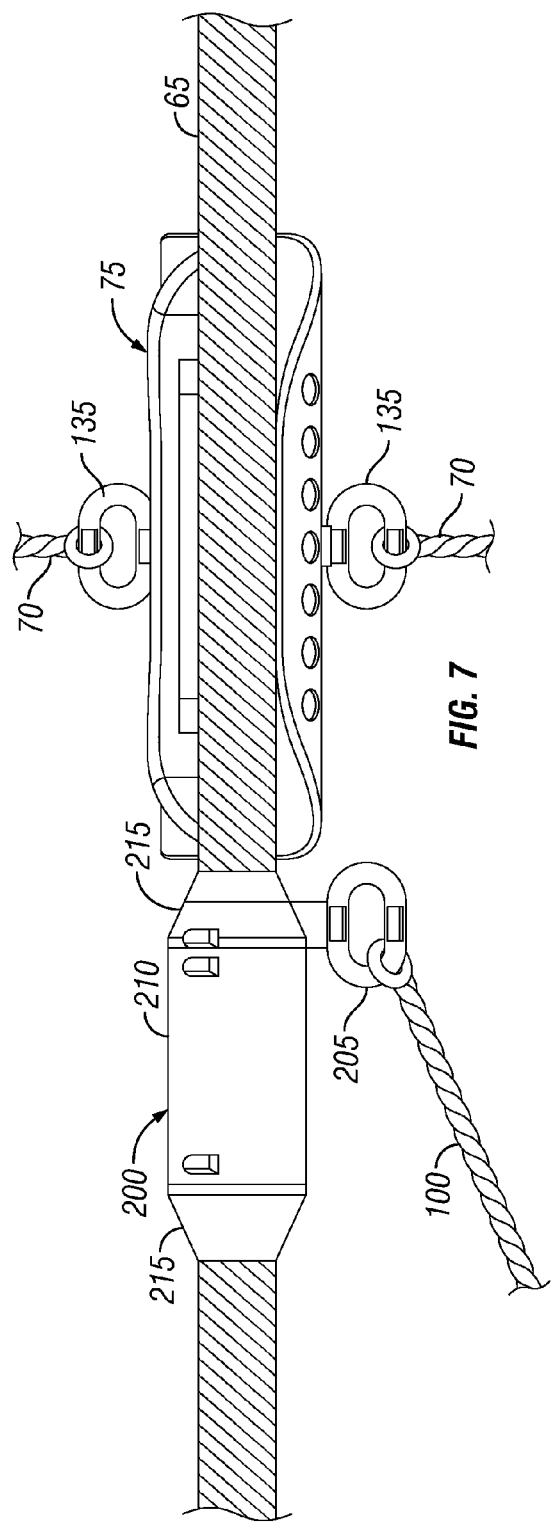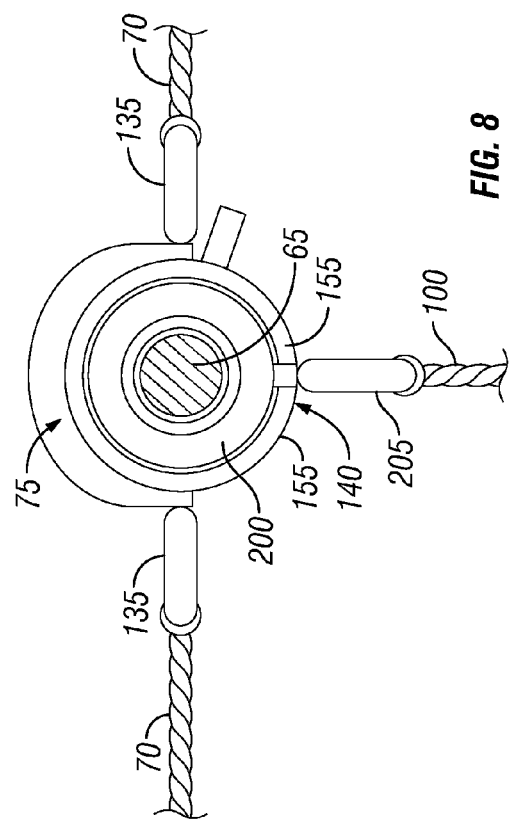

OPEN COLLAR FOR MULTI-CABLE TOWING SYSTEM

BACKGROUND

The present invention generally relates to marine geophysical surveying and, more particularly, in one or more embodiments, to methods and systems for towing multiple source cables with spreader lines coupled to the source cables using open collars.

Certain types of marine geophysical surveying, such as seismic or electromagnetic surveying, may include towing an energy source at a selected depth in a body of water. In some instances, multiple energy sources, such a seismic air guns, may be towed by the vessel. One or more geophysical sensor streamers may also be towed in the water at selected depths. The streamers may be long cables having geophysical sensors disposed thereon at spaced apart locations. Actuation of the energy source emits an energy field into the body of water. The energy field interacts with rock formations below the water bottom with changes in the energy field due to this interaction detected by geophysical sensors positioned on the sensor streamers, for instance. The detected energy may be used to infer certain properties of the subsurface rock, such as structure, mineral composition and fluid content, thereby providing information useful in the recovery of hydrocarbons.

A number of different towing arrangements may be used when towing multiple energy sources from the vessel. In one arrangement, source cables may be used for towing each of the energy sources with spreader lines extending laterally between the source cables. The spreader lines are used to aid in maintaining lateral separation of the energy sources. Collars may be used to secure spreader lines to a particular source cable with the each collar being allowed to slide freely on the respective source cable. It is important for the collars to be allowed to slide freely so that spreader lines can be positioned close to the energy sources to ensure stable separation of the energy sources. However, as the towing arrangements have become more complex, additional connection points or other devices may need to be included on the source cables than can restrict or otherwise limit the ability of the collars to slide freely. If movement of the collars is limited, the spreader lines may not be able to be within sufficient proximity of the energy sources for maintaining the desired lateral separation.

Accordingly, there is a need for improved methods and systems for towing multiple cables in marine geophysical surveys, for example, that can maintain lateral separation of the energy sources.

BRIEF DESCRIPTION OF TUE DRAWINGS

These drawings illustrate certain aspects of some of the embodiments of the present invention and should not be used to limit or define the invention.

FIG. 7 illustrates an example embodiment of an open collar disposed on to source cable.

FIG. 8 illustrates an end view of the open collar of FIG. 7 on the source cable.

DETAILED DESCRIPTION

The present invention generally relates to marine geophysical surveying and, more particularly, in one or more embodiments, to methods and systems for towing multiple source cables with spreader lines coupled to the source cables using open collars. One of the many potential advantages of the present invention, only some of which are disclosed herein, is that the open collars may allow for more complex towing arrangements than have been used previously. For example, additional connection points or other devices may be positioned on the source cable without restricting positioning of the spreader lines as the open collar should be able to move over these types of devices on the source cable.

Figure 1:
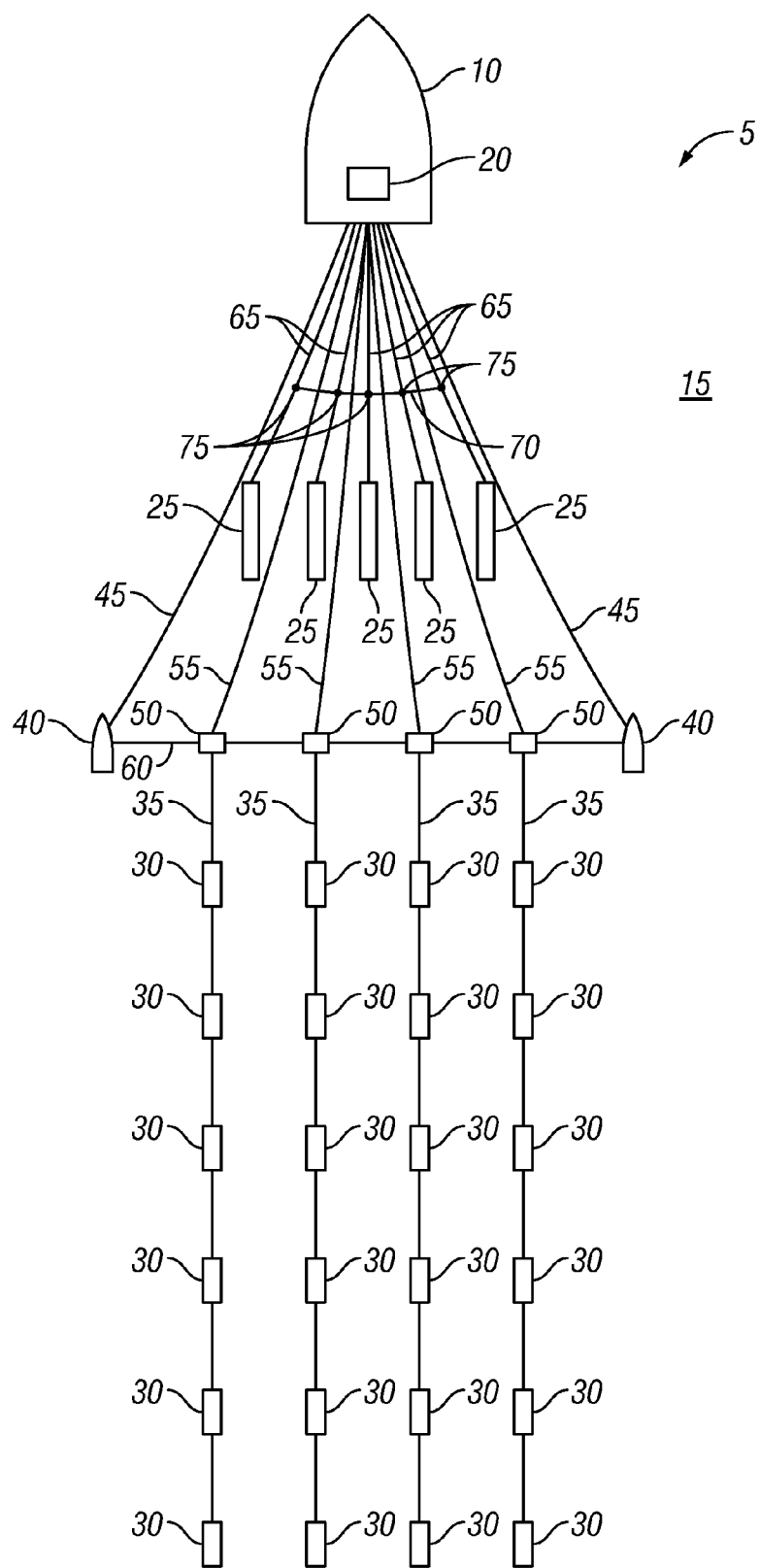
FIG. 1 illustrates an example embodiment of a geophysical survey system comprising multiple energy sources.

FIG. 1 illustrates a marine geophysical survey system 5 in accordance with embodiments of the present invention. In the illustrated embodiment, the marine geophysical survey system 5 may include a survey vessel 10 that moves along the surface of a body of water 15, such as a lake or ocean. The survey vessel 10 may include thereon equipment, shown generally at 20 and referred to for convenience as a "recording system." The recording system 20 typically includes devices (none shown separately) for navigating the survey vessel 10, such as global positioning system ("GPS") receivers, for actuating one or more energy sources 25, and for recording signals generated by the geophysical sensors 30.

As illustrated, the marine geophysical survey system 5 may include a plurality of sensor streamers 35 towed by the survey vessel 10 (or another vessel) with each of the streamers 35 including geophysical sensors 30 at spaced apart locations. The type of geophysical sensors 30 is not a limit on the scope of the present invention and may be, without limitation, seismic sensors such as geophones, hydrophones, or accelerometers, or electromagnetic field sensors, such as electrodes or magnetometers. By way of example, the geophysical sensors 30 may generate response signals, such as electrical or optical signals, in response to detecting energy emitted from the energy sources 25 after the energy has interacted with the rock formations (not shown) below the water bottom. Signals generated by the geophysical sensors 30 may be communicated to the recording system 20.

The sensor streamers 35 may be laterally spaced apart as shown by FIG. 1. "Lateral" or "laterally," in the present context, means transverse to the direction of the motion of the survey vessel 10. The sensor streamers 35 may each be formed, for example, by coupling a plurality of streamer segments end-to-end as explained in U.S. Pat. No. 7,142,481, the disclosure of which is incorporated herein by reference. Lateral positioning of the streamers 35 may be maintained by various towed devices that can generate lateral force as moved through the body of water 15, including deflectors 40 shown at the end of deflector lead-in lines 45. The sensor streamers 35 may be coupled at their forward end (with respect to direction of movement of the survey vessel 10) to terminations 50 which couple the sensor streamers 35 to corresponding lead-in cables 55. The lateral separation of the sensor streamers 35 may be limited by one or more spreader lines 60. In one embodiment, the sensor streamers 35 may include lateral force and depth ("LFD")

control devices (not shown) configured to, for example, regulate streamer depth so that the sensor streamers 35 may be kept as level as possible while towed through the body of water 15. The LFD control devices may be any of a variety of different devices suitable for regulating streamer depth, including "birds" having variable-incidence wings. It should be noted that, while the present example, shows only four sensor streamers 35, the invention is applicable to any number of laterally spaced apart sensor streamers 35 towed by survey vessel 10 or any other vessel. For example, in some embodiments, eight or more laterally spaced apart sensor streamers 35 may be towed by survey vessel 10, while in other embodiments, up to twenty-six laterally spaced apart sensor streamers may be towed by survey vessel 10.

The marine geophysical survey system 5 may further include a plurality of energy sources 25 towed by the survey vessel 10 (or another vessel) by way of source cables 65. As illustrated, the energy sources 25 may be at the end of the source cables 65. In some embodiments, the source cables 65 may include (none shown separately) a strength member to transfer towing force of the survey vessel 10 the energy sources 25, one or more compressed air or gas lines, and electrical and/or optical conductors for communication between the recording system 20 and the energy sources 25. The source cables 65 may be deployed and retrieved from the survey vessel 10 using winches (not shown) or similar spooling devices, for example.

Figure 2:
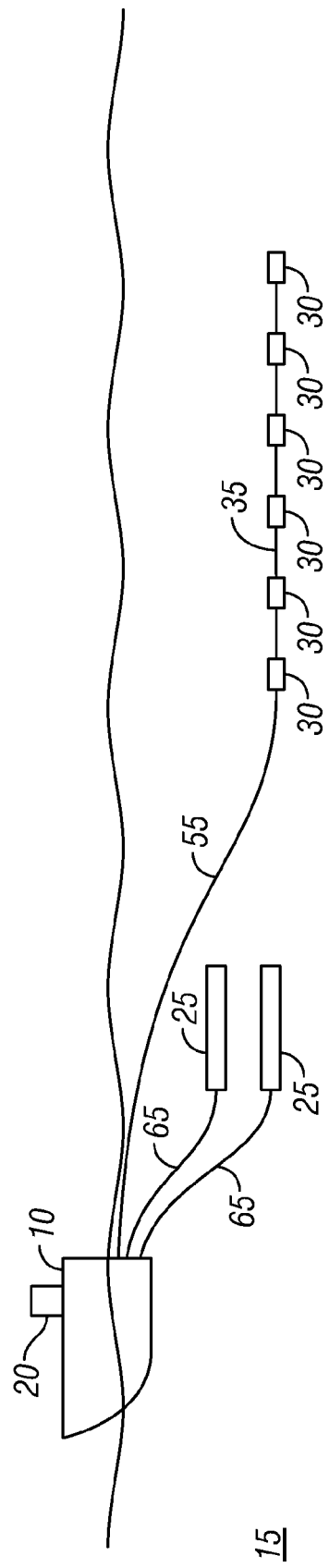
FIG. 2 illustrates a side view of an example embodiment of the geophysical survey system of FIG. 1.

The energy sources 25 may be any selectively actuable sources suitable for subsurface geophysical surveying, including without limitation seismic air guns, water guns, vibrators or arrays of such devices, or one or more electromagnetic field transmitters. In one particular embodiment, the energy sources 25 may each comprise a seismic source array that includes a plurality of air guns (e.g., individual energy sources 80 on FIG. 3). As energy is emitted by the energy sources 25, it travels downwardly through the body of water 15 and rock formations (not shown) below the water bottom. In some embodiments, the timed actuation of the individual airs guns imparts a seismic energy pulse into the body of water 15. Flotation devices (e.g., flotation device 90 on FIG. 3) may be used to provide controllable buoyancy to the energy sources 25. In some embodiments, configurations may be employed where the energy sources may be held a selected depth in the body of water 15 without a flotation device. It should be noted that, while the present example, shows only five energy sources 25, the invention is applicable to any number of laterally spaced apart energy sources 25 towed by survey vessel 10 or any other vessel. The energy sources 25 may be towed in the body of water 15 at the same or different depths. FIG. 2 illustrates an example embodiment of the geophysical survey system 5 of FIG. 1 in which the energy sources 25 (shown at 25a and 25b on FIG. 2) may be towed at different depths. As illustrated, the survey system 5 may comprise two energy sources 25 at different depths in the body of water 15. For ease of reference, flotation devices (e.g., flotation device 90) and spreader lines (e.g., spreader lines 70 shown on FIG. 1) are not shown on FIG. 2. In some embodiments, the energy sources 25 may each be individually towed at a depth of up to about 25 meters or more. For example, the energy sources may each be individually towed at a depth of about 1 meter to about 3 meters. In some embodiments, one or more of the energy sources 25 may towed at a depth of at least about 1 meter, at least about 3 meters, at least about 9 meters or deeper.

Referring again to FIG. 1, spreader lines 70 may be extend between the source cables 65. The spreader lines 70 may act to maintain desired lateral separation between the source cables 65. While not illustrated, deflectors may be used to provide lateral force for separating the source cables 65. In some embodiments, submersible deflectors may be used to provide the lateral force. The spreader lines 70 may be coupled to each of the source cables 65 at open collars 75. The open collars 75 may be dimensioned to slidably fit about the source cables 65. The open collars 75 may be allowed to slide freely on the source cables 65 so that the spreader lines 70 can be positioned close to the energy sources 25 to ensure stable separation of the energy sources 25. Because the open collars 75 do not fully close on the source cables 65, the open collars 75 should slide over certain devices, such as connections points, that may be positioned on the source cables 65 that would otherwise restrict or limit movement of the spreader lines 70 if conventional collars were used instead of the open collars 75.

Figure 3:
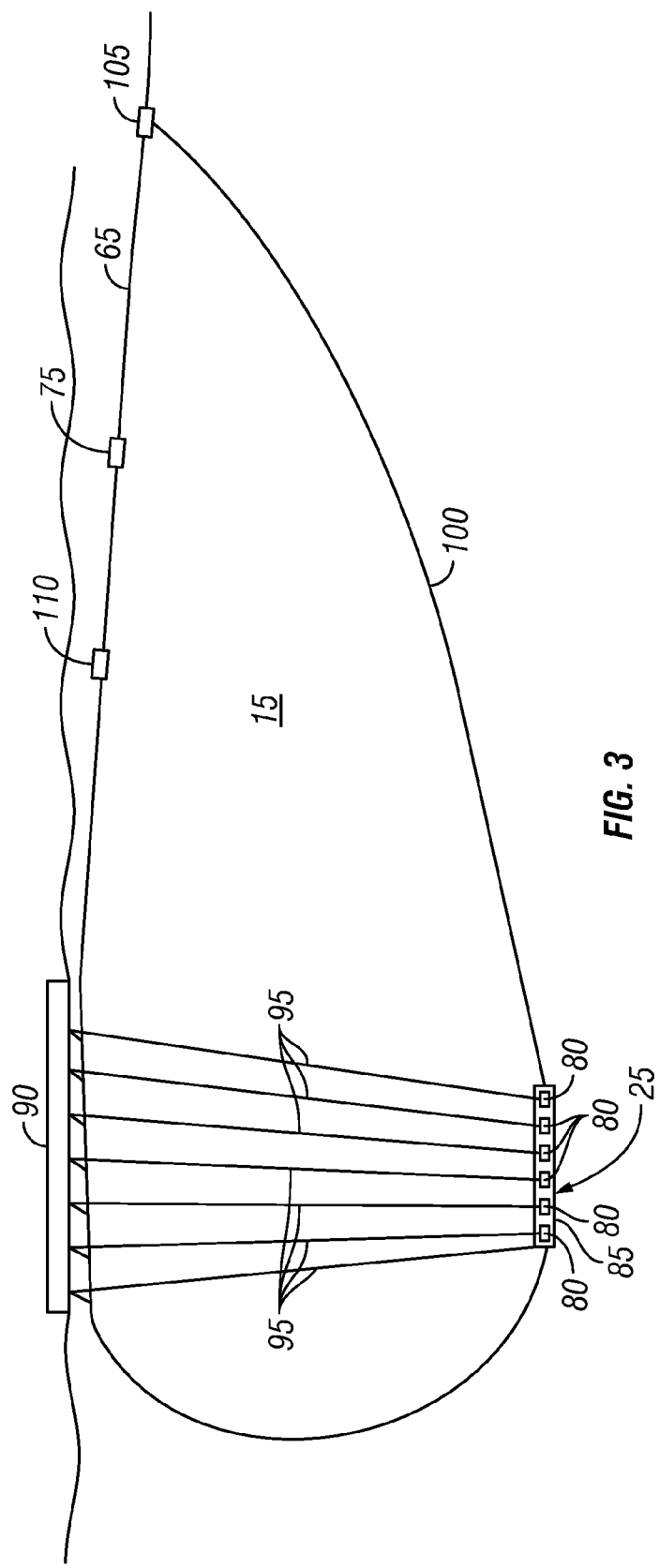
FIG. 3 illustrates an example embodiment of a towing arrangement for an energy source.

Referring now to FIG. 3, the towing arrangement for an energy source 25 is shown in more detail in accordance with embodiments of the present invention. In the illustrated embodiment, the energy source 25 includes an array of individual energy sources 80 e.g., air guns, water guns, marine vibrators, etc) coupled to frame 85. While the individual energy source 80 are shown being at the same depth, they may be positioned to be at different depths in the body of water 15. The frame 85 may be coupled to flotation device 90 by one or more suspension lines 95, which may be a chain, cable, rope, or other suitable connection line. The length of the suspension lines 95 may be selected so that the individual energy sources 80 may be operated at a selected depth in the body of water 15. In some embodiments, the depth may be about 1 meter to about 3 meters. In alternative embodiments, the depth may be at least about 1 meter, at least about 3 meters, at least about 9 meters or deeper. As illustrated, there may be a plurality of suspension lines along the length of the flotation device 90 that each extend from the flotation device 90 to the frame 85. Flotation device 90 may be used to suspend the energy source 25 in the body of water 15. As illustrated, the flotation device 90 may be coupled to the source cable 65. In the illustrated embodiment, the flotation device 90 is coupled to the source cable 65 with the source cable 65 extending down to the energy source 25. The source cable 65 may provide power, signals, air, and the like to the energy source 25. The flotation device 90 may include a buoy, a float, or other similar flotation device as will be apparent to those of ordinary skill in the art. To stabilize the energy source 25 in the body of water 15, for example, the energy source 25 may also be coupled to the source cable 65 by secondary lead-in line 100, which may be a chain, cable, rope, or other suitable connection line. As illustrated, the secondary lead-in line 100 may be coupled to the source cable 65 at connection point 105, which may be a clamp, collar, or other suitable device for coupling the secondary lead-in line 100 to the source cable 65.

Open collar 75 is also shown disposed on the source cable 65. As previously mentioned, the open collar 75 may be used to secure the spreader lines 70 (e.g., shown on FIG. 1) to the source cable 65. The open collar 75 should be allowed to slide on the source cable 65 so that the spreader lines can be positioned proximate the flotation device 90 and, thus, proximate the energy source 25 suspended below the flotation device 90. Because the open collar 75 does not fully close on the source cable 65, the open collar 75 should be able to slide over the attachment point 105 for the secondary lead-in line 100 that would otherwise restrict movement of the open collar 75 if the open collar 75 according to disclosed embodiments was not used.

As illustrated, a mechanical stop 110 may be disposed on the source cable 65 to limit rearward movement of the open collar 75 on the source cable 65. The mechanical stop 110 may be a large clamp or other suitable device positioned on the source cable 65 over which the open collar 75 will not pass. While it is desired for the open collar 75 to slide freely on the source cable 65, it may be desired to restrict rearward movement in some embodiments, for example, to prevent interference of the spreader lines 70 with the flotation device 90 and/or to position spreader lines 70 at a desired position in the body of water 15 with respect to the energy source 25. In some embodiments, the mechanical stop 110 may be positioned from about 5 meters to about 10 meters in front of the flotation device 90.

Figure 4:
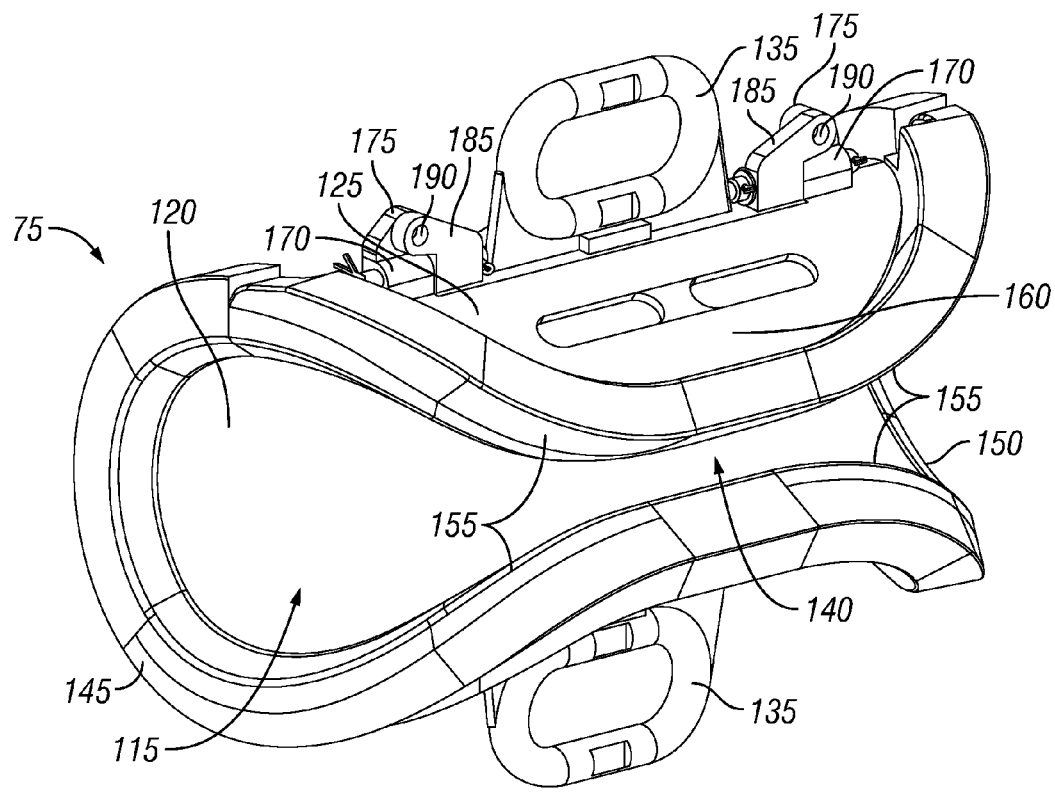
FIG. 4 illustrates an example embodiment of an open collar.
Figure 5:
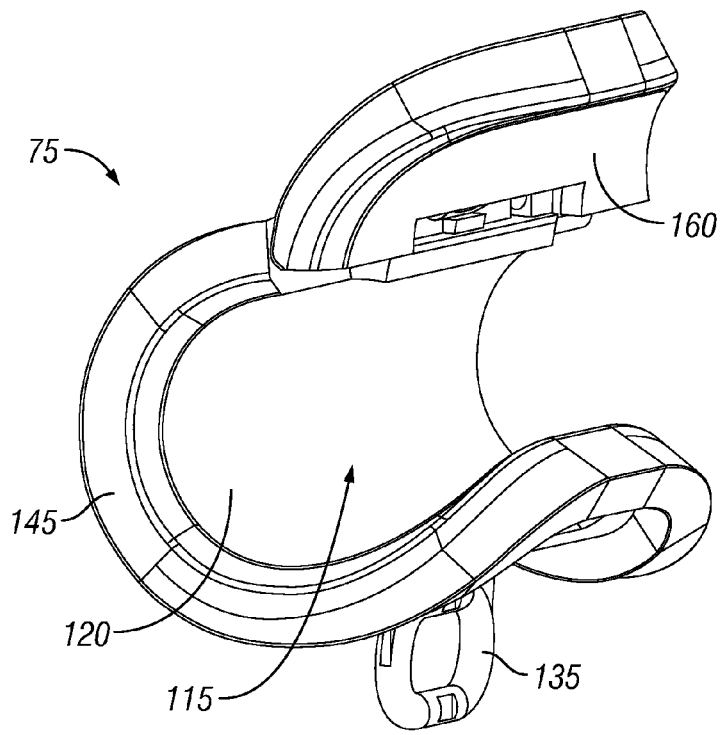
FIGS. 5 and 6 illustrate an example embodiment of an open collar having a hatch in an open position.
Figure 6:
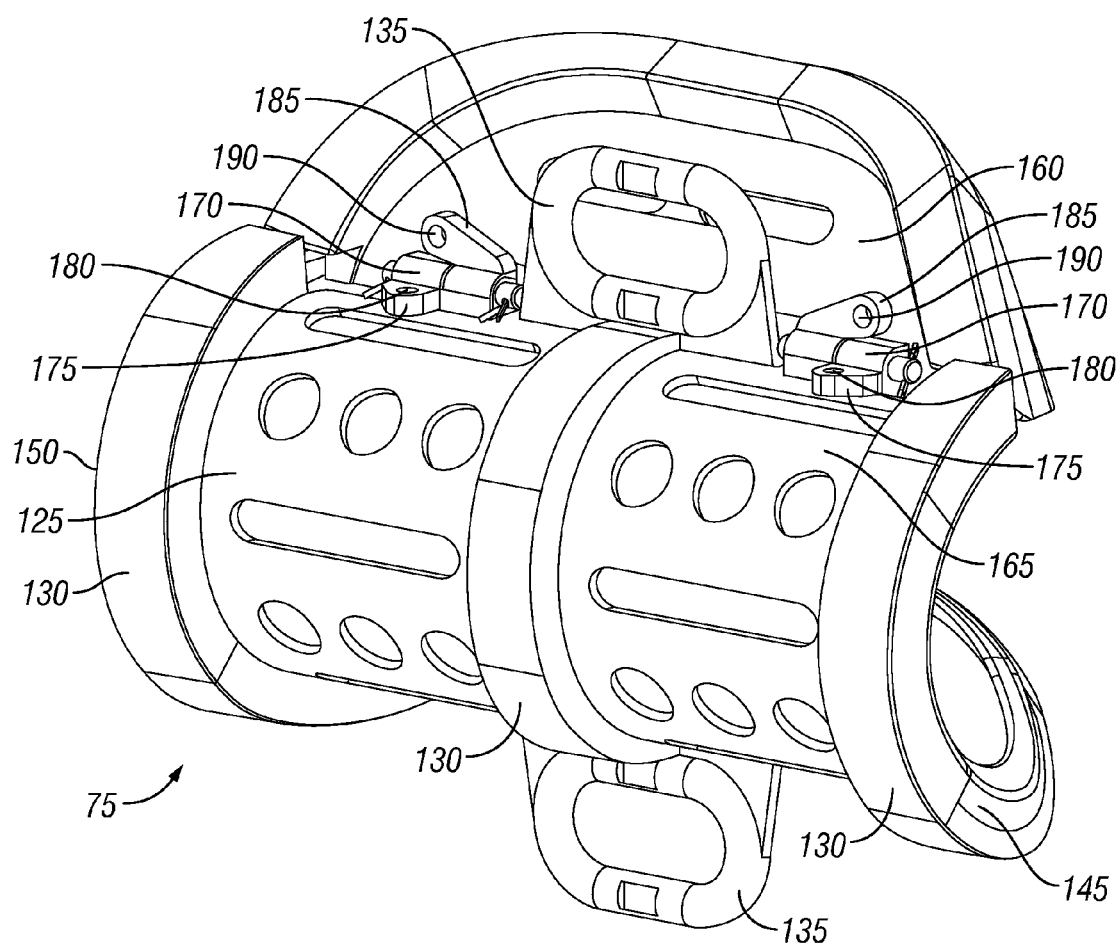

FIGS. 4-6 illustrate an open collar 75 in more detail in accordance with embodiments of the present invention. As illustrated, the open collar 75 may include a through opening 115 that extends longitudinally through the open collar 75 and defines an interior surface 120. In the illustrated embodiment, the through opening 115 is cylindrical in shape. The interior surface 120 may include a friction-reducing material, such as high density polyethylene, polyoxymethylene, or other suitable plastic materials, to reduce friction between the open collar 75 and the source cable 65 (e.g., shown on FIGS. 1, 3, and 7) on which the open collar 75 may be disposed. The open collar 75 may also include an exterior surface 125. As best seen on FIG. 6, the exterior surface 125 may include one or more ribs 130 to provide enhanced strength. The exterior surface 125 may also include rings 135 or other attachment points for securing the spreader lines 70 (e.g., shown on FIG. 1) to the open collar 75.

As best seen on FIG. 4, the open collar 75 may further include a channel 140 that extends from bottom end 145 to top end 150 of the open collar 75. As the open collar 75 slides over any attachment points and other devices (e.g., attachment point 105 shown on FIG. 3, clamping device 200 shown on FIG. 7), any protrusions on the devices can extend through the channel 140 so that the movement of the open collar 75 is not restricted by the protrusion. As illustrated, the channel 140 may have flared openings at either end of the open collar 75. In particular embodiments, the bottom end 145 and the top end 150 may each have sloping surfaces 155 that define the flared openings. The sloping surfaces 155 may act to correct for angular misalignment between the attachment point and the channel 140 wherein the sloping surfaces 155 should guide the protruding portion(s) of the attachment point into the channel 140 so that the open collar 75 can slide past.

With continued reference to FIGS. 4-6, the open collar 75 may further include a hatch 160. The hatch 160 may be configured to open and close to allow for attachment of the open collar 75 to the source cable 65 (e.g., shown on FIGS. 1, 3, and 7). For example, the hatch 160 may be opened to allow placement of the open collar 75 onto the source cable 65 with the source cable 65 positioned in the through opening 115. The hatch 160 may then be closed to secure the open collar 75 onto the hatch 160. Although coupled to the source cable 65, the open collar 75 should be rotatable about and slidably disposed on the source cable 65.

With specific reference to FIG. 6, the hatch 160 may be coupled to the collar body 165 by hinges 170. While hinges 170 are shown other suitable connection mechanisms that should allow opening and closing of the hatch 160 may be used to secure the hatch 160 to the collar body 165. A locking mechanism may also be provided to lock the open collar 75 in the closed position 75 thus securing the open collar 75 on the source cable 65 (e.g., shown on FIGS. 1, 3, and 7). By way of example, each hinge 170 may include first protrusion 175 having through hole 180 and second protruding portion 185 having through hole 190. The first protrusion 175 may rotate with the hatch 160 while second protruding portion 180 may remain stationary, for example. Turning now to FIG. 4, when the hatch 160 is in the closed position, the through holes 180, 190 in the first and second protrusions 175, 180 may be aligned such that a pin (not shown) may positioned in the through holes 180, 190 to secure the hatch 160 in the closed position.

FIGS. 7 and 8 illustrate an open collar 75 sliding over a clamping device 200 that is positioned on the source cable 65. As illustrated, the open collar 75 may be secured to the source cable 65. While the open collar 75 may be secured to the source cable 65 it should still be rotatable about and slidable on the source cable 65. The open collar 75 may couple the spreader lines 70 to the source cable 65 with the spreader lines 70 directly coupled to the rings 135 on the open collar 75. As further illustrated, the clamping device 200 may also be positioned on the source cable 65. The clamping device 200 may be an attachment point (e.g., attachment point 105 on FIG. 3) used to secure a line, such as secondary lead-in line 100, to the source cable 65. The clamping device 200 may include a ring 205 that extends from clamping body 210 that is secured on the source cable 65. The secondary lead-in line 100 may be directly secured to the ring 205. As illustrated, the clamping body 210 may have tapered ends 215, for example, to facilitate passage of the clamping device 200 through the open collar 75.

Because the open collar 75 is not fully closed on the source cable 65, the open collar 75 should be able to slide past the clamping device 200 as the open collar moves on the source cable 65. For example, the open collar 75 may slidably move on the source cable 65 while being towed through a body of water 15 (e.g., shown on FIGS. 1 and 3). Instead of being prevented from sliding past the clamping device 200, the through hole 115 (e.g., shown on FIG. 4) of the open collar 75 should be sized to allow passage of the clamping device 200. Any protrusions or other extensions from the clamping device 200, such as ring 205, should extend through the channel 140 in the open collar 75 as the open collar 75 slides over the clamping device 200, as best seen in FIG. 8. In this manner, the clamping device 200 should not restrict movement of the open collar 75 on the source cable 65. If the channel 140 and the ring 205 are misaligned, the slanted surfaces 155 of the open collar 75 should act to guide the ring 205 into the channel 140. In some embodiments, the ring 205 may be rotatable with respect to the clamping body 210 such that ring 205 may be rotated into alignment with the channel 140.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined, by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. A system for multi-cable towing comprising:
   a plurality of source cables coupled to a survey vessel;
   a plurality of energy sources, wherein each of the energy sources is coupled to a respective one of the source cables;
   a plurality of spreader lines extending between the source cables; and
   a plurality of open collars coupling the spreader lines to the source cables, wherein each of the open collars comprises:
   a through passageway, wherein the through passageway comprises a first end and a second end, wherein a corresponding one of the source cables extends through the through passageway from the first end to the second end,
   an exterior wall disposed around the through passageway, and
   an opening in the exterior wall that divides the exterior wall from the first end to the second end, and wherein the opening is flared at the first end and at the second end.

2. The system of claim 1 wherein the energy sources each comprise an array of seismic energy sources selected from the group consisting of air guns, water guns, marine vibrators, and combinations thereof.

3. The system of claim 1 wherein one or more of the energy sources is suspended in a body of water beneath a flotation device by one or more suspension lines.

4. The system of claim 1 wherein the energy sources comprises two energy sources configured to be towed at different depths in a body of water.

5. The system of claim 1 wherein the system further comprises a secondary lead-in line; the secondary lead-in line coupling one of the energy sources to the respective one of the source cables at an attachment point.

6. The system of claim 5 wherein the attachment point comprises a clamping device having a ring extending from a body of the clamping device, the ring being capable of fitting through the opening in at least one of the open collars as the open collar slides over the clamping device.

7. The system of claim 6 wherein the ring is rotatable with respect to the body of the clamping device.

8. The system of claim 1 wherein the opening has sloping surfaces at the first end and at the second end that cause the opening to flare at the first end and at the second end.

9. The system of claim 1 wherein at least one of the open collars comprise a hatch configured to open and close for attachment of the open collar to one of the source cables.

10. A marine geophysical survey system comprising:
    a plurality of source cables coupled to a survey vessel;
    a plurality of energy sources, wherein each of the energy sources is suspended beneath a flotation device coupled to a respective one of the source cables, the suspended energy source coupled to a distal end of the respective one of the sources cables and further coupled to the respective one of the source cables by a secondary lead-in line;
    a plurality of spreader lines extending between the source cables;
    a plurality of open collars coupling the spreader lines to the source cables; wherein each of the open collars comprises:
    a through passageway, wherein the through passageway comprises a first end and a second end, wherein a corresponding one of the source cables extends through the through passageway from the first end to the second end,
    an exterior wall disposed around the through passageway, and
    an opening in the exterior wall that divides the exterior wall from the first end to the second end, and wherein the opening is flared at the first end and at the second end,
    wherein each of the open collars is configured to slide over an attachment point for the secondary lead-in line on the respective one of the source cables.

11. The system of claim 10 wherein the energy source each comprise an array of seismic energy sources selected from the group consisting of air guns, water guns, marine vibrators, and combinations thereof.

12. A method of marine geophysical surveying comprising:
    towing a plurality of energy sources through a body of water from a survey vessel, wherein source cables couple the energy sources to the survey vessel, and wherein spreader lines extend between the source cables;
    providing open collars that couple the spreader lines to the source cables; wherein each of the open collars comprises:
    a through passageway, wherein the through passageway comprises a first end and a second end, wherein a corresponding one of the source cables extends through the through passageway from the first end to the second end,
    an exterior wall disposed around the through passageway, and
    an opening in the exterior wall that divides the exterior wall from the first end to the second end, and wherein the opening is flared at the first end and at the second end; and
    actuating the energy sources.

13. The method of claim 12 wherein the step of actuating the energy sources emits seismic energy pulses into the body of water.

14. The method of claim 12 wherein the open collars are allowed to slide on the spreader lines.

15. The method of claim 14 wherein the open collars slide over attachments points on the source cables, the attachments points coupling secondary lead-in lines for the energy sources to the source cables.

16. The method of claim 15 wherein at least one of the attachment points includes a ring that passes through the opening of a corresponding one of the open collars.

17. The method of claim 16 wherein the opening has sloping surfaces at the first end and at the second end that cause the opening to flare at the first end and at the second end.

18. The method of claim 12 wherein two or more of the energy sources are towed at different depths in the body of water.

\* \* \* \* \*